US012579056B2

(12) United States Patent
Hicks et al.

(10) Patent No.: US 12,579,056 B2
(45) Date of Patent: Mar. 17, 2026

(54) TEST TAGGING BASED ON FAILURE ANALYSIS

(71) Applicant: INTERNATIONAL BUSINESS MACHINES CORPORATION, Armonk, NY (US)

(72) Inventors: Andrew C. M. Hicks, Highland, NY (US); Deborah A. Furman, Staatsburg, NY (US); Eitan Daniel Farchi, Haifa (IL); James A O'Connor, Ulster Park, NY (US); Michael E Gildein, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 18/475,064

(22) Filed: Sep. 26, 2023

(65) Prior Publication Data

US 2025/0103473 A1 Mar. 27, 2025

(51) Int. Cl.
| | |
|---|---|
| *G06F 9/44* | (2018.01) |
| *G06F 11/3668* | (2025.01) |
| *G06F 11/3698* | (2025.01) |

(52) U.S. Cl.
CPC ...... *G06F 11/3692* (2013.01); *G06F 11/3684* (2013.01); *G06F 11/3688* (2013.01); *G06F 11/3698* (2025.01)

(58) Field of Classification Search
CPC ............. G06F 11/3688; G06F 11/3684; G06F 11/3676; G06F 11/3698; G06F 11/3692; G06F 11/3696; G06F 11/3672; G06F 11/3668; G06F 11/362; G06F 11/3604; G06F 2221/033; G06F 8/20; G06F 8/36; G06F 8/77; G06F 8/43; G06F 11/273; G06F 11/004
See application file for complete search history.

(56) References Cited

U.S. PATENT DOCUMENTS

| | | | |
|---|---|---|---|
| 6,658,651 | B2 | 12/2003 | O'Brien |
| 7,100,152 | B1 | 8/2006 | Birum |
| 8,024,704 | B2 | 9/2011 | Meijer |
| 9,507,698 | B2 | 11/2016 | Gene |
| 10,545,854 | B2 | 1/2020 | Chandra |

(Continued)

FOREIGN PATENT DOCUMENTS

| | | |
|---|---|---|
| CN | 114048129 A | 2/2022 |
| CN | 112835620 B | 3/2022 |

(Continued)

*Primary Examiner* — Chuck O Kendall
(74) *Attorney, Agent, or Firm* — Anthony Curro

(57) ABSTRACT

Tagging a corpus of tests based upon failure analysis. Access tags associated with test cases known to execute without error against an original corpus of source code. Access a test set associated with the accessed tags, the test set containing test cases. Access a new corpus of source code to be tested. Execute the new corpus of source code using test cases from the accessed test set. Access errors generated by execution of the new corpus of source code using the test cases. Determine locations in the new corpus of source code associated with the accessed errors. Execute natural language processing software to generate new tags associated with the locations in the new corpus of source code associated with the accessed errors.

23 Claims, 6 Drawing Sheets

(56)                    References Cited

U.S. PATENT DOCUMENTS

2007/0088986  A1      4/2007  Stark
2012/0054553  A1*    3/2012  Artzi ................... G06F 11/3692
                                                                     714/38.1
2021/0374040  A1*  12/2021  Kumar ................ G06F 11/3688
2023/0055527  A1*    2/2023  Majithia ............... G06F 11/079

FOREIGN PATENT DOCUMENTS

CN          115422095  A      12/2022
CN          119718905  A        3/2025

* cited by examiner

100

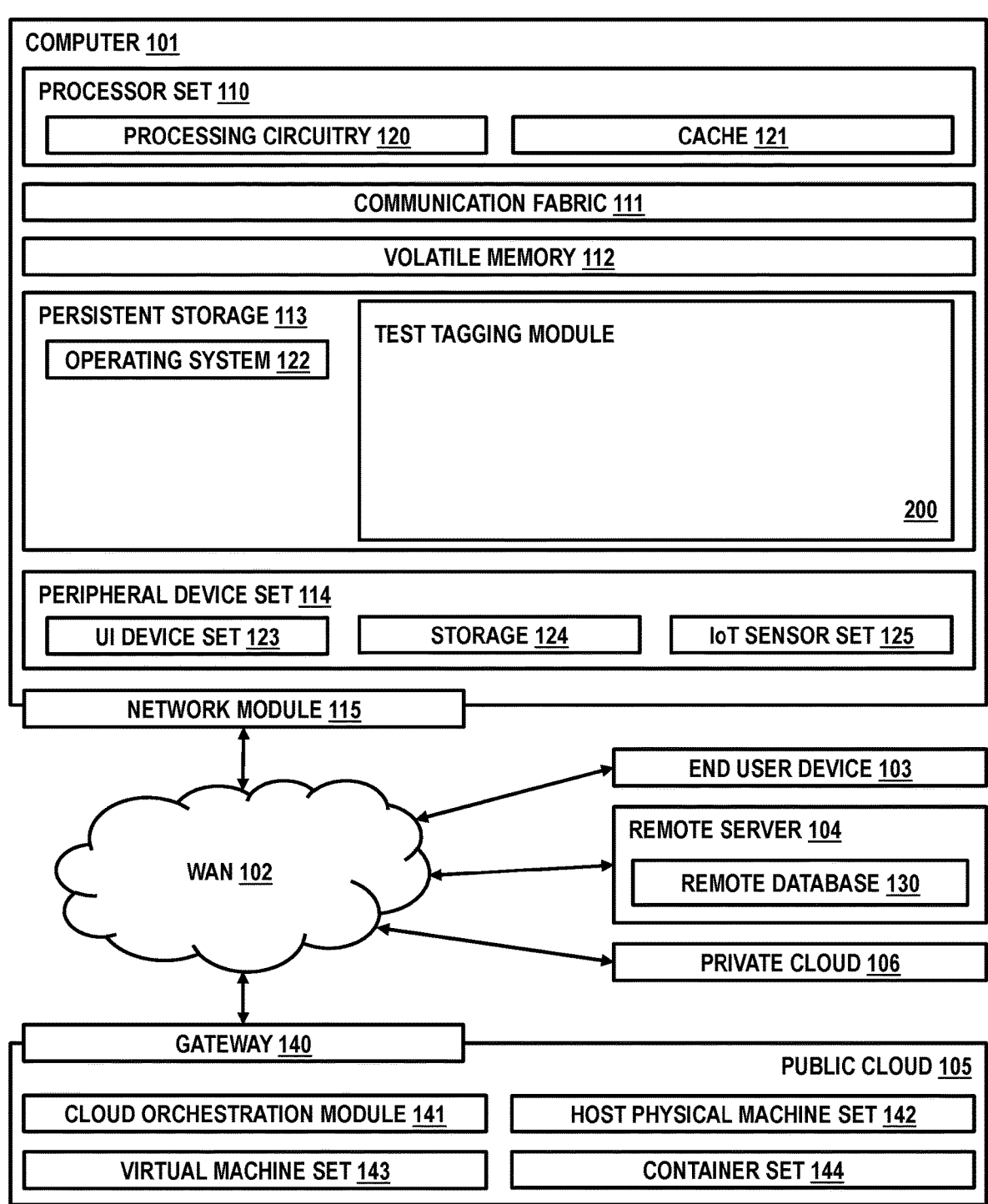

COMPUTER 101

PROCESSOR SET 110

PROCESSING CIRCUITRY 120            CACHE 121

COMMUNICATION FABRIC 111

VOLATILE MEMORY 112

PERSISTENT STORAGE 113

OPERATING SYSTEM 122

TEST TAGGING MODULE

200

PERIPHERAL DEVICE SET 114

UI DEVICE SET 123        STORAGE 124        IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOST PHYSICAL MACHINE SET 142

VIRTUAL MACHINE SET 143        CONTAINER SET 144

FIG. 1

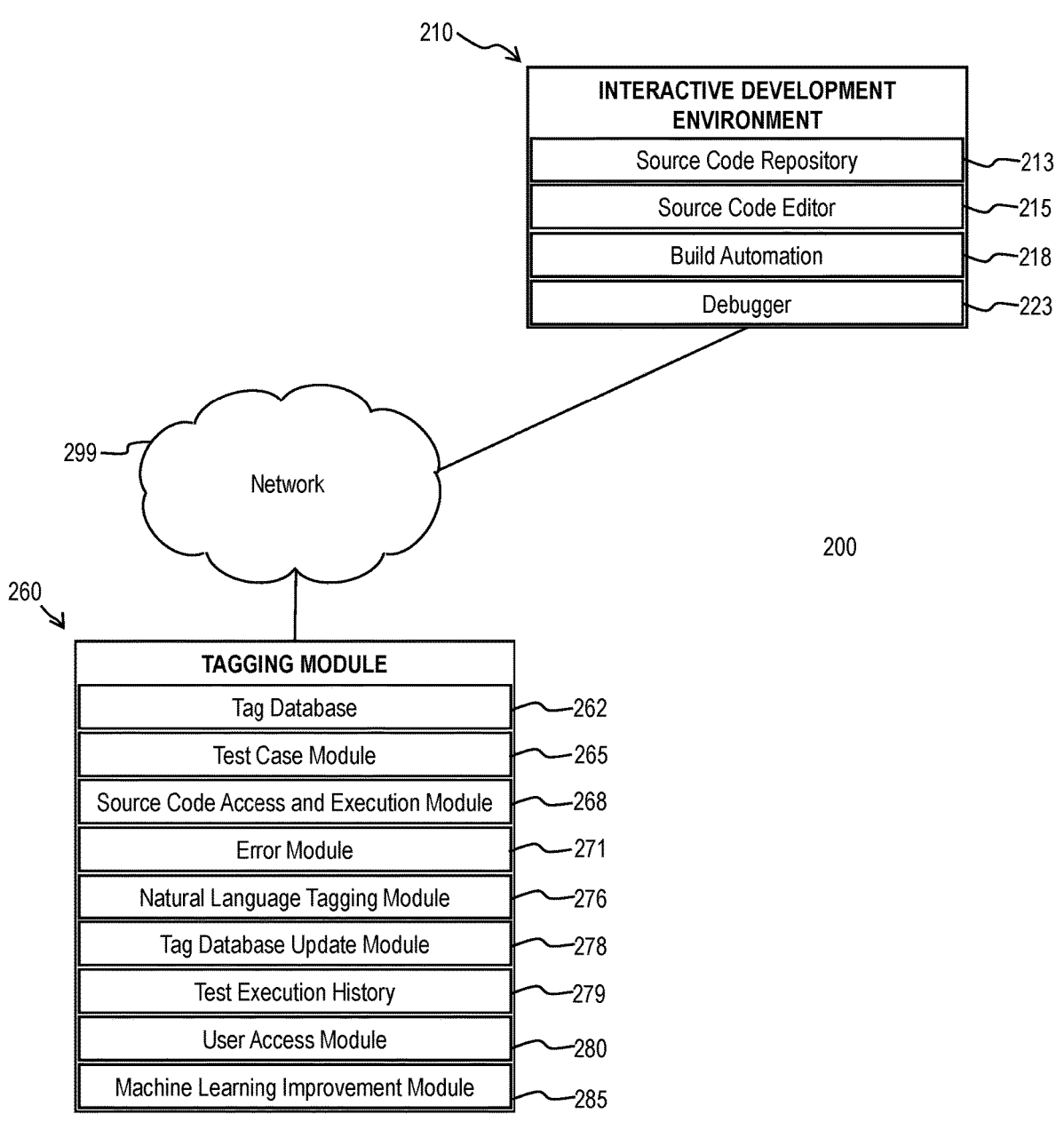

210

| INTERACTIVE DEVELOPMENT ENVIRONMENT | |
| --- | --- |
| Source Code Repository | 213 |
| Source Code Editor | 215 |
| Build Automation | 218 |
| Debugger | 223 |

299

Network

200

260

| TAGGING MODULE | |
| --- | --- |
| Tag Database | 262 |
| Test Case Module | 265 |
| Source Code Access and Execution Module | 268 |
| Error Module | 271 |
| Natural Language Tagging Module | 276 |
| Tag Database Update Module | 278 |
| Test Execution History | 279 |
| User Access Module | 280 |
| Machine Learning Improvement Module | 285 |

*FIG. 2*

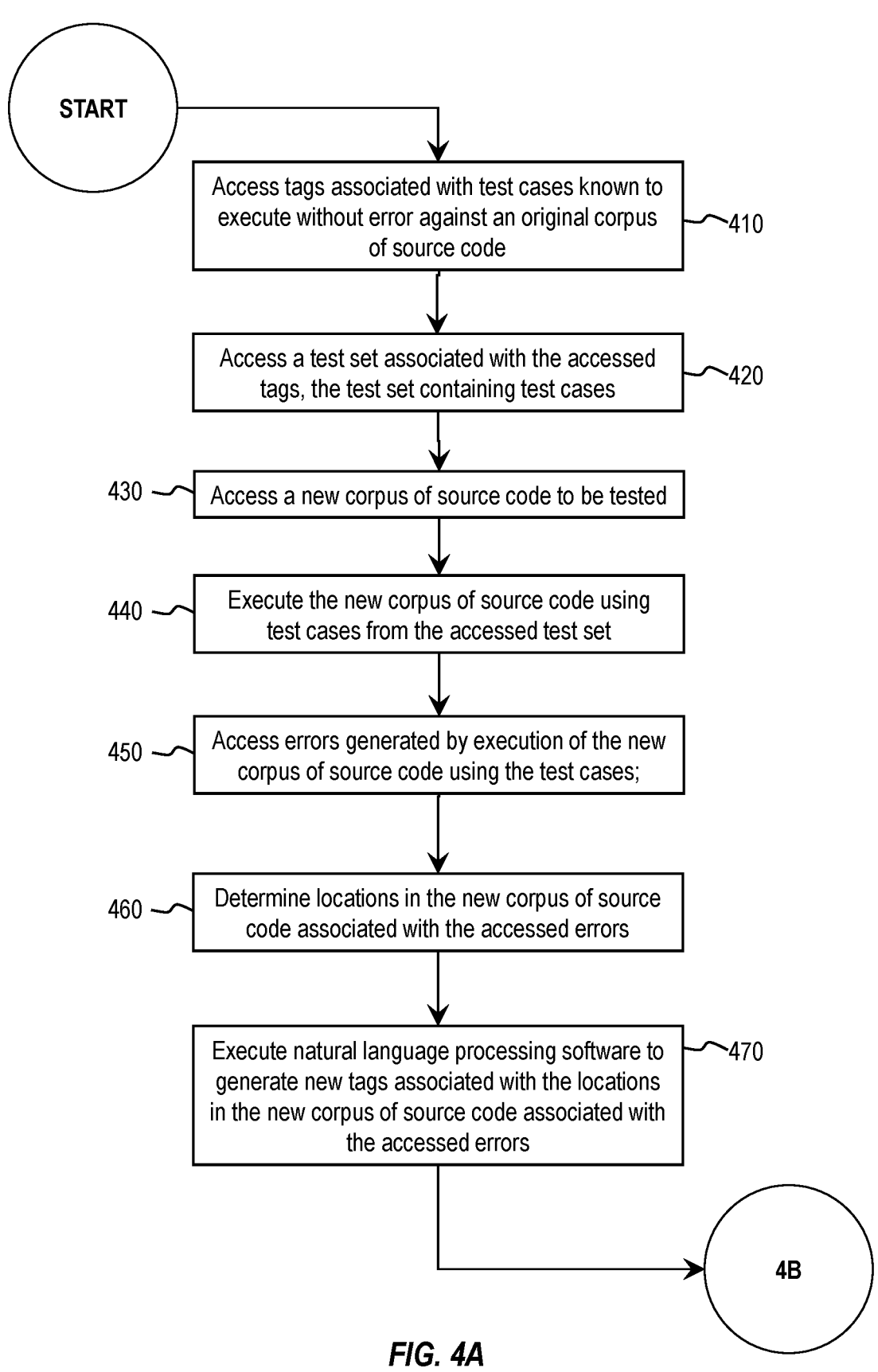

START

Access tags associated with test cases known to execute without error against an original corpus of source code ⌐410

Access a test set associated with the accessed tags, the test set containing test cases ⌐420

430 ⌐ Access a new corpus of source code to be tested

440 ⌐ Execute the new corpus of source code using test cases from the accessed test set 450 ⌐ Access errors generated by execution of the new corpus of source code using the test cases;

460 ⌐ Determine locations in the new corpus of source code associated with the accessed errors Execute natural language processing software to generate new tags associated with the locations in the new corpus of source code associated with the accessed errors ⌐470

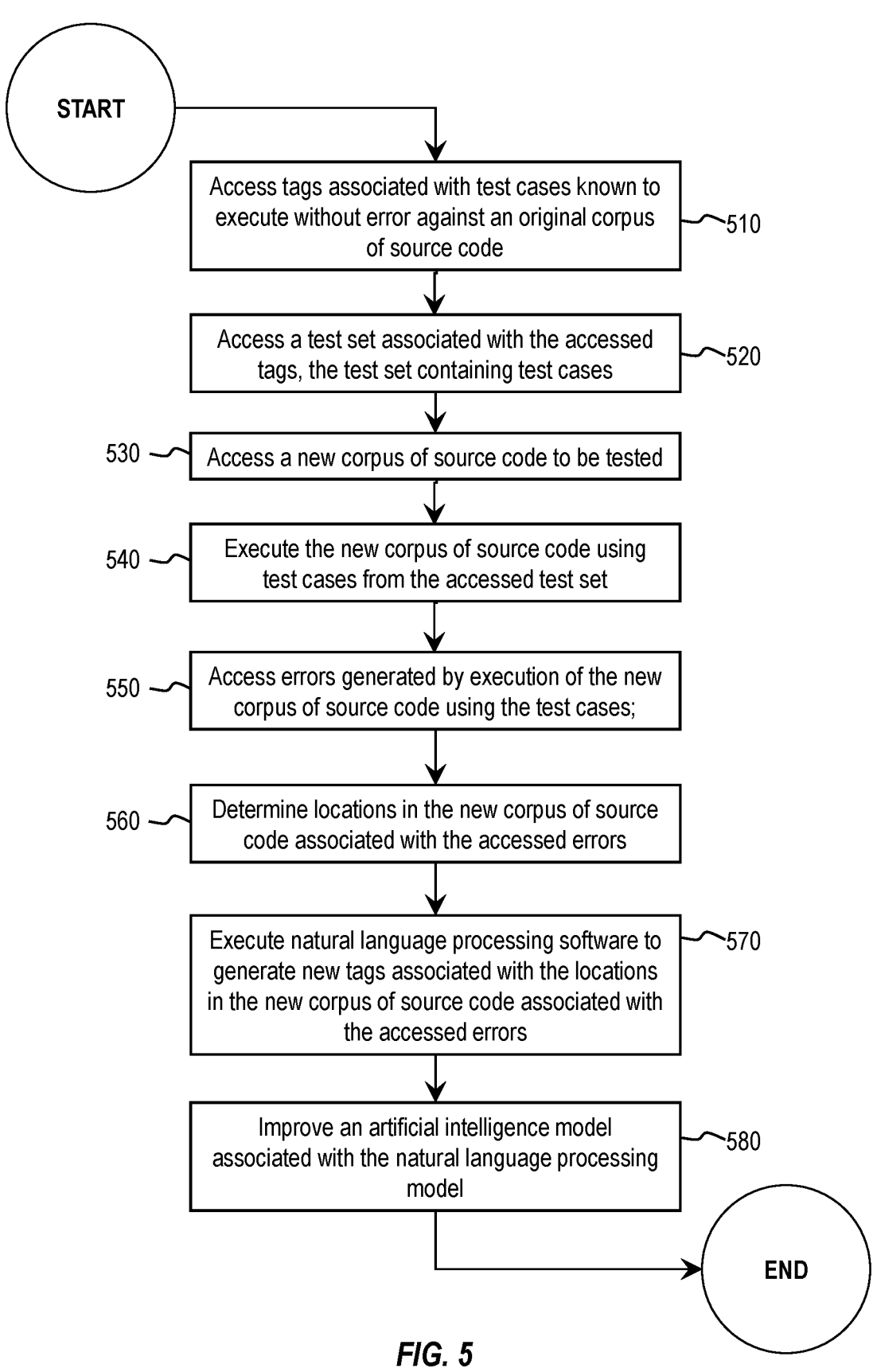

START

Access tags associated with test cases known to execute without error against an original corpus of source code ⌐510

Access a test set associated with the accessed tags, the test set containing test cases ⌐520

530 ⌐ Access a new corpus of source code to be tested

540 ⌐ Execute the new corpus of source code using test cases from the accessed test set 550 ⌐ Access errors generated by execution of the new corpus of source code using the test cases;

560 ⌐ Determine locations in the new corpus of source code associated with the accessed errors Execute natural language processing software to generate new tags associated with the locations in the new corpus of source code associated with the accessed errors ⌐570

Improve an artificial intelligence model associated with the natural language processing model ⌐580

END

*FIG. 5*

TEST TAGGING BASED ON FAILURE ANALYSIS

FIELD OF THE INVENTION

The present invention relates generally to software development and more particularly to tagging software tests based on failure analysis.

BACKGROUND

Presently disclosed embodiments relate to software development, particularly sophisticated software development taking place in, for example, an interactive development environment accessed by multiple individuals. In 2023, software development remains an important area, as software is increasingly complex and written by a large number of developers working collaboratively on projects. Errors and bugs, however, continue to be the bane of complex software development, because as any developer would know, one small bug somewhere in a corpus of source code can lead to compilation errors, run-time errors, logic errors, incorrect results, etc. A large amount of hours may be necessarily spent by developers in order to correct these errors.

In order to facilitate easier editing, run-time testing, validation, debugging, etc. of source code, "tags" may be used with reference to corpuses of tests. The tags may, for example, identify one or more concepts, relationships, characteristics, or resources validated/driven/executed by tests against software or source code. While the tags can assist in the source code development and test process, it is time consuming to tag corpuses of tests. As tests or source code revised, it may be even necessary to continue to add, edit, or modify tags regarding new versions of tests or source code as each version is verified, and an even more substantial amount of effort must be expended every time a new corpus of source code or tests are edited, updated, revised, etc.

A need presents itself for a systematic and continuously revalidated way to tag corpuses of tests.

SUMMARY

Embodiments of the present invention disclose a method, system, and computer program product for using computing device for tagging a corpus of tests based upon failure analysis. The computing device accesses one or more tags associated with one or more test cases known to execute without error against an original corpus of source code. The computing device accesses a test set associated with the one or more accessed tags, the test set containing one or more test cases. The computing device accesses a new corpus of source code to be tested. The computing device executes the new corpus of source code using one or more test cases from the accessed test set. One or more errors generated by execution of the new corpus of source code using the one or more test cases are accessed. One or more locations in the new corpus of source code associated with the accessed one or more errors are determined. Natural language processing software is executed to generate one or more new tags associated with the one or more locations in the new corpus of source code associated with the accessed one or more errors.

In an alternative aspect of the present invention, embodiments disclose a method, system, and computer program product for using a computing device for tagging a corpus of tests based upon failure analysis. The computing device accesses one or more tags associated with one or more test cases known to execute without error against an original corpus of source code. The computing device accesses a test set associated with the one or more accessed tags, the test set containing one or more test cases. The computing device accesses a new corpus of source code to be tested. The computing device executes the new corpus of source code using one or more test cases from the accessed test set. One or more errors generated by execution of the new corpus of source code using the one or more test cases are accessed. One or more locations in the new corpus of source code associated with the accessed one or more errors are determined. Natural language processing software is executed to generate one or more new tags associated with the one or more locations in the new corpus of source code associated with the accessed one or more errors. The computing device accesses the generated one or more new tags associated with the one or more locations in the new corpus of source code. The computing device accesses a new test set associated with the generated one or more new tags, the new test set providing one or more new test cases which provide a more extensive testing of the new corpus of source code related to a category of similar errors.

In another alternative aspect of the present invention, embodiments disclose a method, system, and computer program product for using a computing device for tagging a corpus of tests based upon failure analysis. A computing device accesses one or more tags associated with one or more test cases known to execute without error against an original corpus of source code. The computing device accesses a test set associated with the one or more accessed tags, the test set containing one or more test cases. The computing device accesses a new corpus of source code to be tested. The computing device executes the new corpus of source code using one or more test cases from the accessed test set. One or more errors generated by execution of the new corpus of source code using the one or more test cases are accessed. One or more locations in the new corpus of source code associated with the accessed one or more errors are determined. Natural language processing software is executed to generate one or more new tags associated with the one or more locations in the new corpus of source code associated with the accessed one or more errors. An artificial intelligence model associated with the natural language processing model is improved.

BRIEF DESCRIPTION OF THE DRAWINGS

FIG. 1 represents a networked computer environment 100, in accordance with an embodiment of the present invention.

FIG. 2 is a functional block diagram illustrating modules 200 for tagging of a corpus of tests based upon failure analysis, in accordance with an embodiment of the present invention.

FIGS. 4A and 4B are a flowchart depicting operational steps that a hardware component of a hardware appliance may execute, in accordance with an alternative embodiment of the invention.

FIG. 5 is a flowchart depicting operational steps that a hardware component of a hardware appliance may execute, in accordance with an alternative embodiment of the invention.

DETAILED DESCRIPTION

Figure 3:
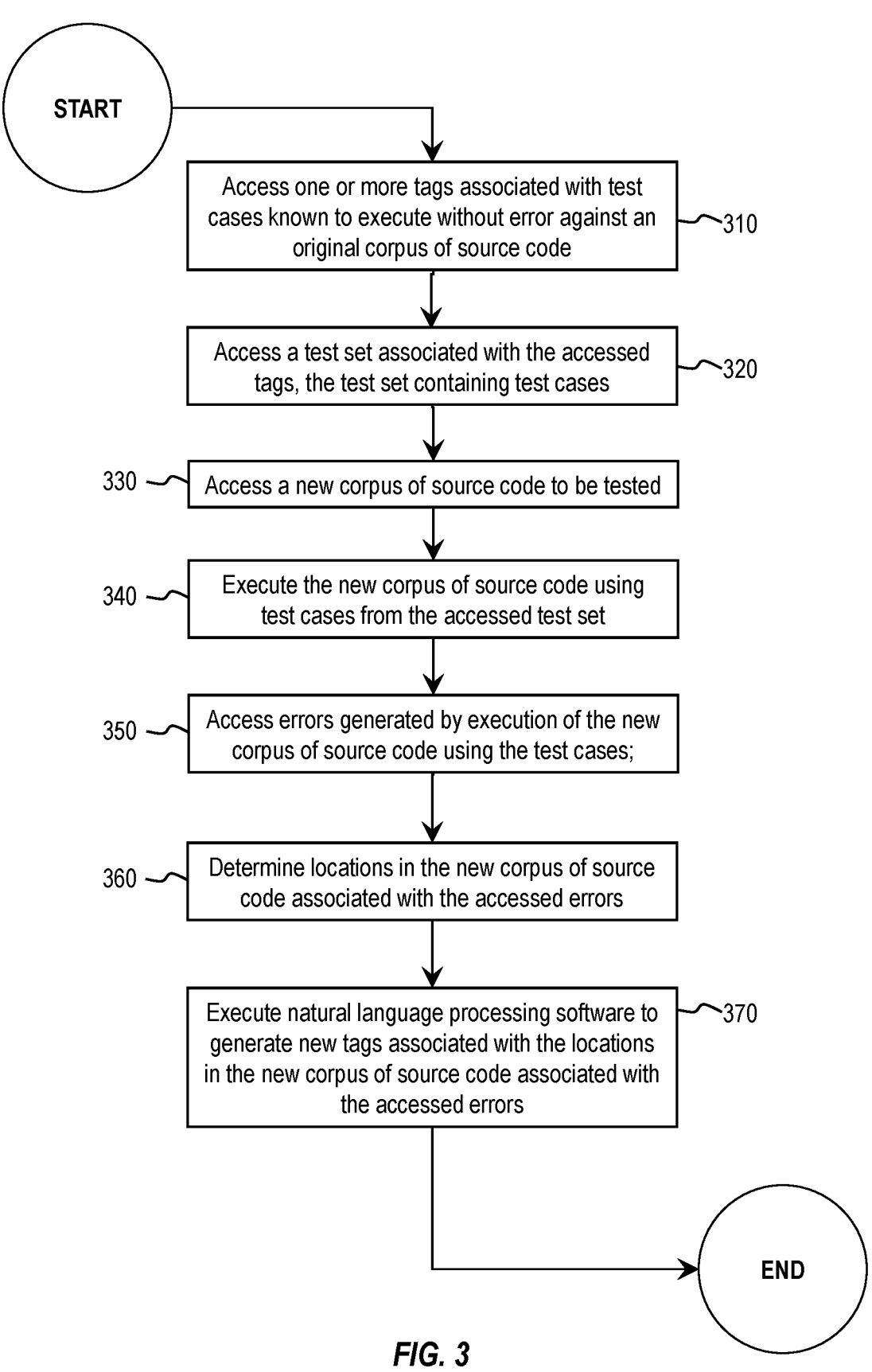
FIG. 3 is a flowchart depicting operational steps that a hardware component of a hardware appliance may execute, in accordance with an embodiment of the invention.

The presently disclosed embodiments relate one or more methods, systems, and computer program products for tagging a corpus of software tests based upon failure analysis. Systematic and continuously revalidated tagging of tests aids in numerous tasks that may be involved with software development, tasks including source code verification, source code debugging, clustering tests, etc. Natural language processing software, such as that powered by artificial intelligence software including large language model(s) streamline the task of tagging tests in an automated fashion. Embodiments of the invention rely or build-upon previous executions of embodiments, using regression analysis of the results of previous executions to tag tests, with the results from previous execution refined and further detailed. Regression analysis may extend to previous versions, rollouts, etc. of source code, or other corpuses of source code which may be related in some way, including updates to tests that validate, drive, or execute the source code.

Presently disclosed embodiments may be utilized in connection with any environment in which source code is being developed, tested, accessed, edited, modified, etc., such as within an interactive development environment which allows multiple developers, project managers, etc. to develop source code (and provides functionality, for example, to view, edit, compile, execute, test, and debug source code). Embodiments of the invention streamline the process of software development by allowing individuals involved in the development process to systematically tag their corpuses of tests. In general, embodiments of the invention may be implemented in different ways while being contemplated by embodiments of the invention. Embodiments of the presently disclosed embodiments may be implemented, for example, as a plug-in to an interactive development environment, as a stand-alone application, as a part of a web browser, or in any other way while being contemplated by embodiments of the invention disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as associated with modules 200 for tagging of a corpus of tests based upon failure analysis. In addition to modules 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and modules 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processor set 110 may be alternatively be referred to herein as one or more "computing device(s)," but computing devices may also refer to one or more CPUs, microchips, integrated circuits, embedded systems, or the equivalent, presently existing or after-arising. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing cir- cuitry. Alternatively, some, or all, of the cache for the processor set may be located "off chip." In some computing environments, processor set 110 may be designed for work- ing with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the meth- ods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in modules 200 in persistent storage 113.

COMMUNICATION FABRIC 111 is the signal conduc- tion path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in modules 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in vari- ous ways, such as Bluetooth connections, Near-Field Com- munication (NFC) connections, connections made by cables (such as universal serial bus (USB) type cables), insertiontype connections (for example, secure digital (SD) card), connections made through local area communication net- works and even connections made through wide area net- works such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and man- ages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetiz- ing and/or de-packetizing data for communication network transmission, and/or web browser software for communi- cating data over the internet. In some embodiments, network control functions and network forwarding functions of net- work module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable pro- gram instructions for performing the inventive methods can typically be downloaded to computer 101 from an external computer or external storage device through a network adapter card or network interface included in network mod- ule 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a functional block diagram illustrating modules 200 for tagging of a corpus of tests based upon failure analysis, in accordance with an embodiment of the present invention. As an overview, FIG. 2 displays interactive development environment 210, tagging module 260, and network 299. Interactive development environment 210 allows for individuals involved in the source code development process to perform various functionality in connection with source code, including accessing, storing, editing, compiling/interpreting, testing, and debugging different versions of source code. Embodiments of the invention may be utilized in connection with various types of source code, included compiled, interpreted scripted, bytecode, or even previously developed software. All of these require testing and may benefit from automated tagging, as discussed in embodiments of the invention. The various functionality provided by interactive development environment 210 may allow a developer, project manager, or other user interested in the development process to check-in, check-out, store, edit, compile/interpret, execute, and debug source code, as well as perform other functionality in connection with different versions of source code stored by interactive development environment 210. Interactive development environment 210, in effect, provides an interface for one or more users to perform various functionality in connection with source code and/or software. Interactive development environment 210 may be implemented as any sort of computer software (and, in various embodiments, associated computer hardware) performing functions as discussed herein. Interactive development environment 210 operates in conjunction with tagging module 260 to systematically and continuously tag corpuses of tests, as discussed further herein.

Tagging module 260, also displayed in FIG. 2, is operatively connected to interactive development environment 210 directly, or via network 299. Alternatively, tagging module 260 is integrated with interactive development environment 210, such as via a plug-in to interactive development environment 210, access to/via a common web browser, or other equivalent means. Generally, and as further discussed in connection with embodiments of the invention disclosed herein, tagging module 260 is responsible for tagging corpuses of tests in an automated fashion utilizing, in various embodiments of the invention, natural language processing software or other techniques to systematically generate tags for various versions of tests. The "tags" may be utilized in various ways, as would be understood by one skill in the art, to flag revisions, different versions, degrees of change, comments, etc. in various different corpuses of source code available from interactive development environment 210. The tags may be utilized by developers, for example, to assist in manually find bugs in source code, generate clustering tests, etc. or assist in automatically debugging source code. In embodiments of the invention, as further discussed herein, tagging module 260 operates via regression to utilize results of previous execution(s) of tagging module 260 in order to obtain the best results in an expedited and efficient manner (i.e. obtaining the "best" tags for corpuses of tests). Tagging module 260 may be implemented as any sort of computer hardware (and, in various embodiments, associated computer hardware, for performing functions as discussed). In various embodiments of the invention, tagging module 260 may, for example, access source code available from interactive development environment 210, access features of interactive development environment 210 to automatically compile, interpret, or otherwise execution source code, and, as further discussed herein, systematically tag tests accessed from interactive development environment 210.

As further displayed in FIG. 2, in various embodiments of the invention, tagging module 260 and interactive development environment 210 are connected to and via network 299. In various embodiments of the invention, network 299 represents, for example, any sort of computer network such as a local area network (LAN), a wide area network (WAN) such as the Internet, and includes wired, wireless, or fiber optic connections. In various embodiments, network 299 is substantially the same as WAN 102, discussed in connection with FIG. 1 herein. In general, network 299 may be any combination of connections and protocols that will support communications between interactive development environment 210 and tagging module 260, in accordance with embodiments of the invention. In further embodiments of the invention, network 299 may represent an internal bus associated with a single or multicore processor executing both interactive development environment 210 and tagging module 260 (such as in embodiments where interactive development environment 210 and tagging module 260 are integrated).

Discussing elements displayed in FIG. 2 in further detail, interactive development environment 210 represents computer software (and, in various embodiments, associated computer hardware) for performing various functionality in connection with source code, including accessing, storing, editing, compiling/interpreting, executing, and debugging corpuses of source code. As one of skill in the art would understand, interactive development environment 210 provides the various facilities necessary for one or more developers, project managers, etc. to develop, test, execute, debug, etc. software. As discussed elsewhere herein, in embodiments of the invention, interactive development environment 210 is operatively connected to tagging module 260, or integrated with tagging module 260.

In various embodiments of the invention, interactive development environment 210 includes one or more of source code repository 213, source code editor 215, build automation 218, and debugger 223.

Source code repository 213 represents software and/or hardware for storing, accessing, checking-in, checking-out, saving, etc. different corpuses of source code made available from developers (such as via upload, via source code editor 215, or otherwise). Source code repository 213 stores the source code in accessible form. As one of skill in the art understands, as multiple developers, project managers, etc. continue to edit source code, it is important to store multiple versions of the uploaded corpuses of source code in case it is necessary to roll-back to a different version (such as because of a loss of an important section, a bug, a poorly designed new object, etc.) If a downstream developer makes a large mistake, rather than re-write an entire corpus of source code, it is a simple matter to simply roll-back to a previous version using source code repository 213. As discussed in the context of disclosed embodiments, however, as new corpuses, versions, etc. of source code are checked-into source code repository, it may be necessary to "tag" important tests that are related to the source code such as via concepts, execution, and/or logic. The time consuming task of tagging an existing or new corpus of tests for source code in repository 213 can be streamlined in connection with embodiments of this invention. In embodiments of the invention, source code repository 213 stores one or more test sets (each containing one or more test cases for testing a corpus of source code) associated with each corpus of source code, as well as one or more updates to the test sets (as discussed further herein).

Source code editor 215 represents software and/or hardware for providing facilities for a user, developer, project manager, etc. to develop and edit source code in interactive development environment 210. Source code editor 215 may also provide various options for a developer, project manager, etc. to check-in source code, request compilation of source code, execute source code, debug source code, etc., as discussed in connection with source code repository 213, source code editor 215, build automation 218, and debugger 223.

Build automation 218 represents software and/or hardware for automatically (or upon request) compiling corpuses of source code stored in source code repository 213. Depending on the type of source code being considered, build automation 218 may be associated with a compiler, interpreter, or in another, equivalent, manner to convert high-level, human-readable source code into machine language for execution by a computing device. In the context of embodiments of the invention, build automation 218 may be invoked by tagging module 260 in order to request compilation and/or execution of corpuses of source code, for further utilization as discussed in embodiments disclosed herein (such as for use with debugging or automatically tagging corpuses of tests). Build automation 218, in various embodiments of the invention, is associated with one or more compilers/debuggers.

Debugger 223 represents software and/or hardware to automatically debug software, or aid in manual debugging by a developer. Debugger 223 may be associated with build automation 218 and/or a compiler/interpreter (not shown). In the context of compiling, interpreting, or otherwise executing corpuses of source code, debugger may track one or more errors including, for example, compilation errors, run-time errors, or other errors generated by compiler/ interpreter (not shown, associated with build automation 218). Errors tracked by debugger 223 may be transmitted to tagging module 260 for further utilization. Errors tracked may utilized in various ways in the context of embodiments of the invention (as discussed more fully herein).

Continuing with regard to elements of FIG. 2, tagging module 260 represents computer software (and, in various embodiments, associated computer hardware) for tagging corpuses of tests in an automated fashion. As discussed elsewhere herein, corpuses of source code are maintained by interactive development environment 210, including different versions, updates, edits, etc. of related source code projects. As one of skill in the art understands, interactive development environment 210 stores different versions, etc. of source code since it may be necessary to roll-back to a previous version, such as if the current version of source code is buggy, not providing correct results, etc. Generally, tagging module 260 presents technology to systematically tag corpuses of tests associated with the different versions of source code, and via regression execution improve and generate new tags based on previous tag creation, as further discussed herein. New tags generated by tagging module 260 may be displayed to a user via a user interface associated with interactive development environment 210, such as source code editor 215.

In various embodiment of the invention, tagging module 260 includes one or more of tag database 262, test case module 265, source code access and execution module 268, error module 271, natural language tagging module 276, tag database update module 278, test execution history 279, user access module 280, and machine learning improvement module 285.

Tag database 262 represents software and/or hardware for storing, accessing, and making available one or more "tags" associated with different versions of tests available from interactive development environment 210. The tags, stored by tag database 262 may be, in various embodiments, associated with one or more test cases known to execute without error against an original corpus of source code available from interactive development environment 210, or generated by other iterations of embodiments of the invention. In embodiments of the invention, execution begins by accessing by a computing device from tag database 262 one or more tags associated with one or more test cases known to execute without error against an original corpus of source code. Beginning execution with tags associated with test cases known to execute without error against an original corpus of source code provides for efficient and effective tagging of related corpuses of tests, with the "tags" related used as a starting point for execution of other aspects or iterations of the invention. In embodiments of the invention, tag database 262 is also responsible for storing one or more newly generated tags, which are further utilized in regression execution of embodiments of the invention, in order to generate newer or more detailed tags of other corpuses of tests. As new tags are generated by iterations of embodiments of the invention, they are stored by tag database 262 for further utilization, as discussed further herein.

Test case module 265 represents software and/or hardware for accessing, downloading, modifying, updating, uploading, etc. one or more test sets from interactive development environment 210. As discussed in connection with tag database 262, and other embodiments disclosed herein, test set(s) are associated with one or more accessed tags. Each test set accessed from interactive development environment 210 may contain one or more test cases for testing corpuses of source code, including, for example, testing variables, methods, interfaces, input, output etc. as well as, in embodiments of the invention, testing concepts, relationships, characteristics, resources, which may be validated/driven/executed by the tests. In an embodiment of the invention, when execution begins the test set accessed from test case module 265 is known to contain one or more test cases known execute without error against an original corpus of source code accessed from interactive development environment 210. In various embodiments of the invention, test case module 265 also provides functionality to access a new test set of one or more new test cases, the new test set associated with one or more generated new tags (as further discussed herein). A "new test set" as discussed herein refers to an update, change, or modification from the "test cases known to execute without error." The new test set associated with the generated one or more new tags provides for more extensive testing of a new corpus of source code (i.e. the new test set is composed of one or more test cases may provide more detailed information regarding the types of errors encountered in debugging, since the new test set has been previously associated with other corpuses/bodies of source code which have had similar errors in the past. The other corpuses/bodies may be previous versions of the new corpus of source code, completely un-related source code, compiled software, or some combination of these). The new test set may be automatically derived from other corpuses/bodies of source code (such as by a machine learning model), manually created, etc. Errors encountered by previous versions of source code and associated tests will likely be similar to new errors encountered by newer versions of source code and associated tests, so execution of new embodiments of the invention with newer versions of source code and associated tests is a good starting place. As execution of embodiments of the invention proceeds, test case module 265 may also be associated with generation of a still newer test set, the still newer test set associated with the one or more new errors available from error module 271, etc. In connection with these embodiments, the new locations in the new corpus of source code are associated with the accessed one or more new errors, and the one or more still newer tags. As would be appreciated by one of skill in the art, continued executions of embodiments of the invention result in finer and more detailed results, via regression execution. In various embodiments of the invention, one or more new generated new tags may be further associated with test execution history 279, to provide further information to developers, project managers, etc. regarding execution of different versions of source code, errors, tags, etc.

Source code access and execution module 268 represents software and/or hardware for accessing corpuses of source code from interactive development environment 210. Source code stored by interactive development environment 210 may be in different forms such as uncompiled, compiled, or partially compiled and may be of different types such as interpreted, scripted, etc. As developers continue to edit, modify, and upload new corpuses of source code to interactive development environment 210, interactive development environment continues to store (referred to also as "check-in") previous versions of source code, since it may be necessary to "roll back" to a previous version, or for other reasons. Different versions of source code are utilized as discussed herein. For means of clarity, an "original corpus of source code" refers to a first version of such source code being considered, while a "new corpus of source code" refers to another corpus of source code containing edits, improvements, modifications, etc. to the "original corpus of source code." In embodiments of the invention, newer and still newer edits, improvements, modifications, etc. to each successive version may be stored, accessed, tagged, etc. by interactive development environment 210. Via regression execution of embodiments of invention, the newer and still newer versions of the source code may be accessed and modified in connection with further iterations of the invention. In alternative embodiments of the invention, the new corpus of source code is simply new code entirely (versus the original corpus of source code). Execution of embodiments of the invention in connection with newer and still newer versions of the source code serves to update both the corpuses of tests to reflect the newer and still newer versions of the source code, etc.

Source code access and execution module 268 also serves to request execution of the various corpuses, versions, etc. of source code by interactive development environment 210. Execution requested by source code access and execution module 268 is related to execution of a specific corpus of source code, using a certain set of test cases from a certain test set. As discussed herein, the various sets of test cases may be referred to "one or more test cases known to execute without error," "a new test set," "a still newer test set," etc.

As embodiments of the invention execute, discusses test cases are executed via a regression execution operation as further discussed herein, for new tags regarding updates to a corpus of tests. As execution proceeds, execution may be requested with new test cases from a new test set, or a still newer test set, etc. As one of skill in the art understands, each successive test set is an update or newly generated iteration of previous test sets, in order to tag corpuses of tests in an efficient manner.

Error module 271 represents software and/or hardware for accessing one or more errors associated with execution of various corpuses of source code with different test sets. Interactive development environment 210, after being requested by source code access and execution module 268 to execute a certain corpus of source code with a certain test set, accesses one or more errors generated by execution of the certain corpus of source code. These errors may include, by non-limiting example, compilation errors, run-time errors, logic errors, incorrect results, etc. As one or more errors are generated by execution of various corpuses of source code, these errors are accessed by error module 271 for further use as discussed herein. As also as discussed herein, error module 271 is also associated with detection of new errors detected by generation by execution of the new corpus of source code using one or more new test cases, detection of further errors associated with execution of various corpuses of source code, etc. Generally, errors may be associated with one or more newly edited sections of different versions of source code versus the previous version (such as because, for example, a developer mistypes a method or variable name in a new section of source code).

Error module 271, in conjunction with source code access and execution module 268 and other modules as discussed in FIG. 2 for determining one or more locations in the various corpuses of source code associated with the accessed errors. If, continuing with the previous example, a developer mistypes the variable "foo," causing a run-time error, error module 271 locates where in the corpus of source code the mistyped variable "foo" is. As execution proceeds, error module 271 may similarly determine one or more new locations in the new corpus of source code associated with new errors, etc. In various embodiments of the invention, error module 271 may simply receive from interactive development 210 a location of an error in a corpus of source code, as well as what section of the source code received the error, and what variable/method, or an equivalent means.

Natural language tagging module 276 represents software and/or hardware for generation of new tags for various corpuses of tests. After errors are accessed (or otherwise detected) and one or more locations associated with the errors are determined by error module 271, natural language tagging module 276 automatically tags these potential error areas of corpuses of source code automatically and, in embodiments of the invention, also tags one or more tests in a corpus of tests associated with the errors. In various embodiments of the invention, natural language tagging module 276 may rely, at least in part, on various developmental metadata such as developmental metadata associated with the source code development process, preferred edits by different developers, etc. in tagging corpuses of tests.

Natural language tagging module 276, in various embodiments of the invention, may rely upon an artificial intelligence-based model (such as a large language model), to easily and rapidly generate new tags for associated corpuses of tests. The large language model may be trained, re-trained, etc. using previously tagged corpuses of source code and sets of tests in order for rapid generation of new tags to take place in an easy manner. Large language models used may be based upon general utilization with source code, but improved by training, re-training, etc. by specifically tagged similar corpuses of tests (as discussed further in connection with machine learning improvement module 285). In various embodiments of the invention, as regression execution continues, natural language tagging module 276 continues to generate still newer tags for further downstream versions of the tests, with the still newer tags providing a more detailed failure analysis of the new corpus of source code available from interactive development environment 210, etc. (as further discussed herein). "New tags," "newer tags," "still newer tags," etc. are committed to tag database 262 as they are created, for further utilization with future iterations of embodiments of the invention.

Tag database update module 278 represents software and/or hardware for updating of records of tags generated in connection with regression execution of iterations of the invention. Records of tags are utilized in order to make more detailed tags, as execution continues (as discussed herein).

Test execution history 279 represents software and/or hardware for storing records of execution of previous iterations of disclosed embodiments. Text execution history 279 contains, in various embodiments, records of different of source code, associated corpuses of tests (i.e. test cases), associated errors, and other data discussed herein to be used in embodiments of the invention.

User access module 280 represents software and/or hardware for a user to access and view the one or more new tags, corpuses of tests, the determined one or more locations in the new corpus of source code associated with the accessed one or more errors, and other data as discussed in connection with embodiments of the invention. The various users (developers, project managers, etc.), may access the one or more errors via interactive development environment 210 (in communication with user access module 280), or in another way.

Machine learning improvement module 285 represents software and/or hardware for improving operation of a machine learning module utilized in connection with embodiments of the invention (such as in connection with natural language tagging module 276). In embodiments where natural language tagging module 276 utilizes a large language model, for example, the large language model may have been previously trained primarily on corpuses of fiction and little source code, so machine learning improvement module 285 may utilize specifically corpuses of source code, test cases, etc. to "improve" the large language model for better utilization in connection with embodiments of the invention. The tagged corpuses of test cases, for example, may be used to, for example, train or re-train large language model. In embodiments of the invention where a different type of artificial intelligence, neural network, etc. is used in connection with natural language processing software (discussed in connection with natural language tagging module 276), machine learning improvement module 285 may be used to improve a functionality of those.

FIG. 3 is a flowchart depicting operational steps that a hardware component, multiple hardware components, and/or a hardware appliance may execute, in accordance with an embodiment of the invention. As shown in FIG. 3, at step 310, tag database 262 accesses one or more tags associated with one or more test cases known to execute without error against an original corpus of source code. At step 320, test case module 265 accesses a test set associated with the one or more accessed tags, the test set containing one or more test cases. At step 330, source code access and execution 218 module accesses a new corpus of source code to be tested. At step 340, source code access and execution module 268 executes the new corpus of source code using one or more test cases from the accessed test set. At step 350, error module 271 accesses one or more errors generated by execution of the new corpus of source code using the one or more test cases. At step 360, error module 271 determines one or more locations in the new corpus of source code associated with the accessed one or more errors. At step 370, natural language tagging module 276 executes natural language processing software to generate one or more new tags associated with the one or more locations in the new corpus of source code associated with the accessed one or more errors. Execution of an embodiment such as presented in FIG. 3 presents the advantage of systematically "tagging" a new corpus of tests, to present time savings, work efficiency, as well as accuracy in terms of these automatically generated tags to developers, project managers, etc., and anyone else with an interest in source code or other software.

Figure 4B:
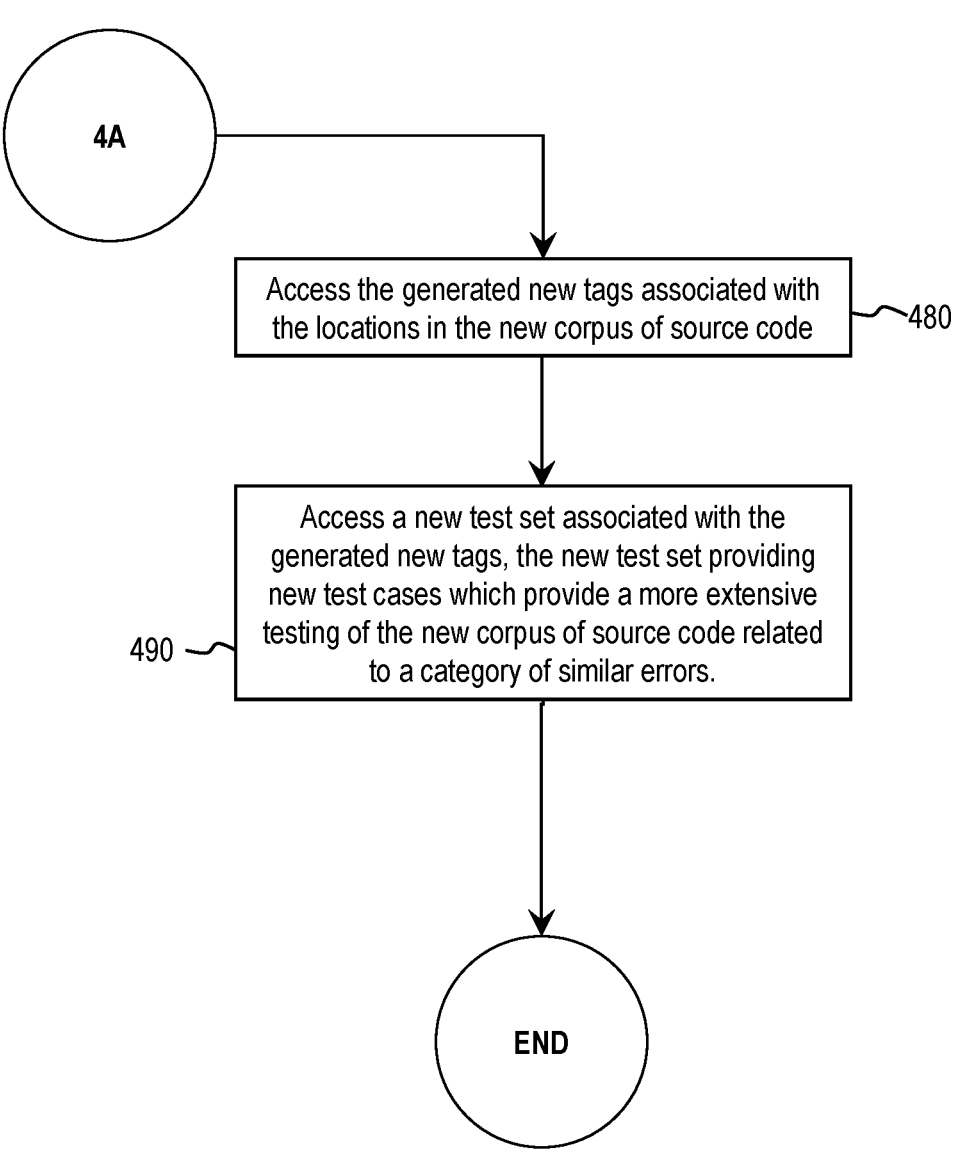

FIGS. 4A and 4B is a flowchart depicting alternative operational steps that a hardware component, multiple hardware components, and/or a hardware appliance may execute, in accordance with an embodiment of the invention. As shown in FIG. 4A, at step 410, tag database 262 accesses one or more tags associated with one or more test cases known to execute without error against an original corpus of source code. At step 420, test case module 265 accesses a test set associated with the one or more accessed tags, the test set containing one or more test cases. At step 430, source code access and execution 218 module accesses a new corpus of source code to be tested. At step 440, source code access and execution module 268 executes the new corpus of source code using one or more test cases from the accessed test set. At step 450, error module 271 accesses one or more errors generated by execution of the new corpus of source code using the one or more test cases. At step 460, error module 271 determines one or more locations in the new corpus of source code associated with the accessed one or more errors. At step 470, natural language tagging module 276 executes natural language processing software to generate one or more new tags associated with the one or more locations in the new corpus of source code associated with the accessed one or more errors.

As execution continues to FIG. 4B, at step 480 tag database 262 accesses the generated one or more new tags associated with the one or more locations in the new corpus of source code. At step 490, test case module 265 accesses a new test set associated with the generated new tags, the new test set providing new test cases which provide a more extensive testing of the new corpus of source code related to a category of similar errors. Execution of an embodiment such as presented in FIGS. 4A and 4B present the advantage of using automatically generated new tags to also automatically, and more thoroughly tag a corpus of tests which may be more relevant to the type of automatically generated tags, presenting further time savings, work efficiency, as well as accuracy in terms of these automatically generated tags to developers, project managers, etc., and anyone else with an interest in source code or other software, particularly as the new versions of source code or software are rolled-out.

FIG. 5 is a flowchart depicting alternative operational steps that a hardware component, multiple hardware components, and/or a hardware appliance may execute, in accordance with an embodiment of the invention. As shown in FIG. 5, at step 510 tag database 262 accesses one or more tags associated with one or more test cases known to execute without error against an original corpus of source code. At step 520, test case module 265 accesses a test set associated with the one or more accessed tags, the test set containing one or more test cases. At step 530, source code access and execution 218 module accesses a new corpus of source code to be tested. At step 540, source code access and execution module 268 executes the new corpus of source code using one or more test cases from the accessed test set. At step 550, error module 271 accesses one or more errors generated by execution of the new corpus of source code using the one or more test cases. At step 560, error module 271 determines one or more locations in the new corpus of source code associated with the accessed one or more errors. At step 570, natural language tagging module 276 executes natural language processing software to generate one or more new tags associated with the one or more locations in the new corpus of source code associated with the accessed one or more errors. At step 580, machine learning improvement module 285 improves an artificial intelligence model associated with the natural language processing module. Execution of an embodiment such as presented in FIG. 5 presents the advantage of generating new tags for a new corpus of source code (saving time, improving work efficiency, and improving accuracy), as well as automatically improving the artificial intelligence model which is used in ways, as discussed herein. Improvement of the artificial intelligence model is useful in connection with execution of other embodiments of the invention, improving, for example, accuracy and speed of predictions.

Based on the foregoing, methods, systems, and computer program products have been disclosed. However, numerous modifications and substitutions can be made without deviating from the scope of the present invention. Therefore, the present invention has been disclosed by way of example and not limitation.

What is claimed is:

1. A method using a computing device for tagging a corpus of tests based upon failure analysis, the method comprising:

accessing by a computing device one or more tags associated with one or more test cases known to execute without error against an original corpus of source code;

accessing by the computing device a test set associated with the one or more accessed tags, the test set containing one or more test cases;

accessing by the computing device a new corpus of source code to be tested;

executing by the computing device the new corpus of source code using one or more test cases from the accessed test set;

accessing one or more errors generated by execution of the new corpus of source code using the one or more test cases;

determining one or more locations in the new corpus of source code associated with the accessed one or more errors;

executing by the computing device natural language processing software to generate one or more new tags associated with the one or more locations in the new corpus of source code associated with the accessed one or more errors;

accessing by the computing device the generated one or more new tags associated with the one or more locations in the new corpus of source code; and accessing by the computing device a new test set associated with the generated one or more new tags, the new test set providing one or more new test cases which provide a more extensive testing of the new corpus of source code related to a category of similar errors.

2. The method of claim 1, further comprising:

executing by the computing the device the new corpus of source code using one or more new test cases from the new test set;

accessing one or more new errors generated by execution of the new corpus of source code using one or more new test cases;

determining one or more new locations in the new corpus of source code associated with the accessed one or more new errors; and executing by the computing device natural language processing software to generate one or more still newer tags associated with the one or more new locations in the new corpus of source code associated with the accessed one or more new errors, the still newer tags providing a more detailed failure analysis of the new corpus of source code.

3. The method of claim 1, where the new test set is derived from other corpuses of source code which previously encountered similar errors.

4. The method of claim 2, further comprising accessing a still newer test set, the still newer test set associated with the one or more new errors, the new locations in the new corpus of source code associated with the accessed one or more new errors, and the one or more still newer tags.

5. The method of claim 1, wherein the new corpus of source code to be tested is an update or a new version of the original corpus of source code.

6. The method of claim 5, wherein the one or more errors generated by execution of the new corpus of source code are associated with one or more edits in the new corpus of source code versus the original corpus of source code.

7. The method of claim 1, wherein the original corpus of source code is compiled or interpreted.

8. The method of claim 1, wherein the one or more new tags and the determined one or more locations in the new corpus of source code associated with the accessed one or more errors are displayed to one or more users via an interface.

9. The method of claim 1, wherein the new corpus of source code, the one or more new tags, and the determined one or more locations in the new corpus of source code are used to improve an artificial intelligence model associated with the natural language processing software.

10. The method of claim 1, wherein the new corpus of source code is being submitted to a repository.

11. The method of claim 10, wherein the repository contains source code, one or more test sets, and one or more updates to the test sets.

12. The method of claim 1, wherein the one or more new tags associated with the one or more locations in the new corpus of source code associated with accessed one or more errors are generated based upon a test execution history.

13. The method of claim 1, wherein the natural language processing software is associated with a large language model.

14. The method of claim 1, wherein when the natural language processing software generates one or more new tags associated with the one or more locations in the new corpus of source code, the natural language processing software relies, at least in-part, on development metadata.

15. A method using a computing device for tagging a corpus of tests based upon failure analysis, the method comprising:

accessing by a computing device one or more tags associated with one or more test cases known to execute without error against an original corpus of source code;

accessing by the computing device a test set associated with the one or more accessed tags, the test set containing one or more test cases;

accessing by the computing device a new corpus of source code to be tested;

executing by the computing device the new corpus of source code using one or more test cases from the accessed test set;

accessing one or more errors generated by execution of the new corpus of source code using the one or more test cases;

determining one or more locations in the new corpus of source code associated with the accessed one or more errors;

executing by the computing device natural language processing software to generate one or more new tags associated with the one or more locations in the new corpus of source code associated with the accessed one or more errors;

accessing by the computing device the generated one or more new tags associated with the one or more locations in the new corpus of source code; and accessing by the computing device a new test set associated with the generated one or more new tags, the new test set providing one or more new test cases which provide a more extensive testing of the new corpus of source code related to a category of similar errors.

16. The method of claim 15, further comprising:

executing by the computing the device the new corpus of source code using one or more new test cases from the new test set;

accessing one or more new errors generated by execution of the new corpus of source code using one or more new test cases;

determining one or more new locations in the new corpus of source code associated with the accessed one or more new errors; and executing by the computing device natural language processing software to generate one or more still newer tags associated with the one or more new locations in the new corpus of source code associated with the accessed one or more new errors, the still newer tags providing a more detailed failure analysis of the new corpus of source code.

17. The method of claim 1, where the new test set is derived from other corpuses of source code which previously encountered similar errors.

18. A method using a computing device for tagging a corpus of tests based upon failure analysis, the method comprising:

accessing by a computing device one or more tags associated with one or more test cases known to execute without error against an original corpus of source code;

accessing by the computing device a test set associated with the one or more accessed tags, the test set containing one or more test cases;

accessing by the computing device a new corpus of source code to be tested;

executing by the computing device the new corpus of source code using one or more test cases from the accessed test set;

accessing one or more errors generated by execution of the new corpus of source code using the one or more test cases;

determining one or more locations in the new corpus of source code associated with the accessed one or more errors;

executing by the computing device natural language processing software to generate one or more new tags associated with the one or more locations in the new corpus of source code associated with the accessed one or more errors; and improving by the computing device an artificial intelligence model associated with the natural language processing model, the artificial intelligence model improved by re-training with previously tagged corpuses of source code and sets of one or more test cases.

19. A computer system for tagging a corpus of tests based upon failure analysis, the computer system comprising:

one or more computer processors;

one or more computer-readable storage media;

program instructions stored on the computer-readable storage media for execution by at least one of the one or more processors, the program instructions comprising:

program instructions to access by one or more tags associated with one or more test cases known to execute without error against an original corpus of source code;

program instructions to access a test set associated with the one or more accessed tags, the test set containing one or more test cases;

program instructions to access a new corpus of source code to be tested;

program instructions to execute the new corpus of source code using one or more test cases from the accessed test set;

program instructions to access one or more errors generated by execution of the new corpus of source code using the one or more test cases;

program instructions to determine one or more locations in the new corpus of source code associated with the accessed one or more errors;

program instructions to execute natural language processing software to generate one or more new tags associated with the one or more locations in the new corpus of source code associated with the accessed one or more errors;

program instructions to access the generated one or more new tags associated with the one or more locations in the new corpus of source code; and program instructions to access a new test set associated with the generated one or more new tags, the new test set providing one or more new test cases which provide a more extensive testing of the new corpus of source code related to a category of similar errors.

20. The computer system of claim 19, where the new test set is derived from other corpuses of source code which previously encountered similar errors.

21. A computer program product for tagging a corpus of tests based upon failure analysis, the computer program product comprising:

one or more non-transitory computer-readable storage media and program instructions stored on the one or more non-transitory computer-readable storage media capable of performing a method, the method comprising:

accessing by a computing device one or more tags associated with one or more test cases known to execute without error against an original corpus of source code;

accessing by the computing device a test set associated with the one or more accessed tags, the test set containing one or more test cases;

accessing by the computing device a new corpus of source code to be tested;

executing by the computing device the new corpus of source code using one or more test cases from the accessed test set; 'accessing one or more errors generated by execution of the new corpus of source code using the one or more test cases;

determining one or more locations in the new corpus of source code associated with the accessed one or more errors;

executing by the computing device natural language processing software to generate one or more new tags associated with the one or more locations in the new corpus of source code associated with the accessed one or more errors; and improving by the computing device an artificial intelligence model associated with the natural language processing model, the artificial intelligence model improved by re-training with previously tagged corpuses of source code and sets of one or more test cases.

22. The computer program product of claim 21, wherein the natural language process software is associated with a machine learning model.

23. The computer program product of claim 22, wherein the machine learning model is a large language model.

* * * * *